United States Patent
Nielsen

(10) Patent No.: US 9,992,586 B2
(45) Date of Patent: Jun. 5, 2018

(54) METHOD OF OPTIMIZING PARAMETERS IN A HEARING AID SYSTEM AND A HEARING AID SYSTEM

(71) Applicant: Widex A/S, Lynge (DK)

(72) Inventor: Jens Brehm Nielsen, Lynge (DK)

(73) Assignee: Widex A/S, Lynge (DK)

( * ) Notice: Subject to any disclaimer, the term of this patent is extended or adjusted under 35 U.S.C. 154(b) by 0 days. days.

(21) Appl. No.: 15/400,437

(22) Filed: Jan. 6, 2017

(65) Prior Publication Data

US 2017/0118565 A1 Apr. 27, 2017

Related U.S. Application Data

(63) Continuation-in-part of application No. PCT/EP2014/064579, filed on Jul. 8, 2014.

(51) Int. Cl.
*H04R 25/00* (2006.01)
*G06F 3/16* (2006.01)

(52) U.S. Cl.
CPC ............ *H04R 25/505* (2013.01); *G06F 3/162* (2013.01); *H04R 25/558* (2013.01); *H04R 25/70* (2013.01); *H04R 25/75* (2013.01)

(58) Field of Classification Search
CPC ...... H04R 25/70; H04R 25/75; H04R 25/505; H04R 25/558; G06F 3/162
See application file for complete search history.

(56) References Cited

U.S. PATENT DOCUMENTS 9,084,066 B2 * 7/2015 De Vries ................ H04R 25/70

FOREIGN PATENT DOCUMENTS

WO 2007/042043 A2 4/2007

OTHER PUBLICATIONS

Ypma, A. et al., "Bayesian Feature Selection for Hearing Aid Personalization", Machine Learning for Signal Processing, 2007 IEEE Workshop On, IEEE, PI, Aug. 1, 2007, pp. 425-430, XP031199124.
Groot, P. C. et al., "Predicting Preference Judgments of Individual Normal and Hearing-Impaired Listeners With Gaussian Processes", IEEE Transactions on Audio, Speech and Language Processing, IEEE Service Center, New York, NY. USA, vol. 19, No. 4, May 1, 2011, pp. 811-821, XP011352007.

* cited by examiner

*Primary Examiner* — Brian Ensey
(74) *Attorney, Agent, or Firm* — Sughrue Mion, PLLC

(57) ABSTRACT

A method of optimizing parameters in a hearing aid system (100) with respect to a user's preference and a hearing aid system (100) adapted to carry out such a method.

21 Claims, 1 Drawing Sheet

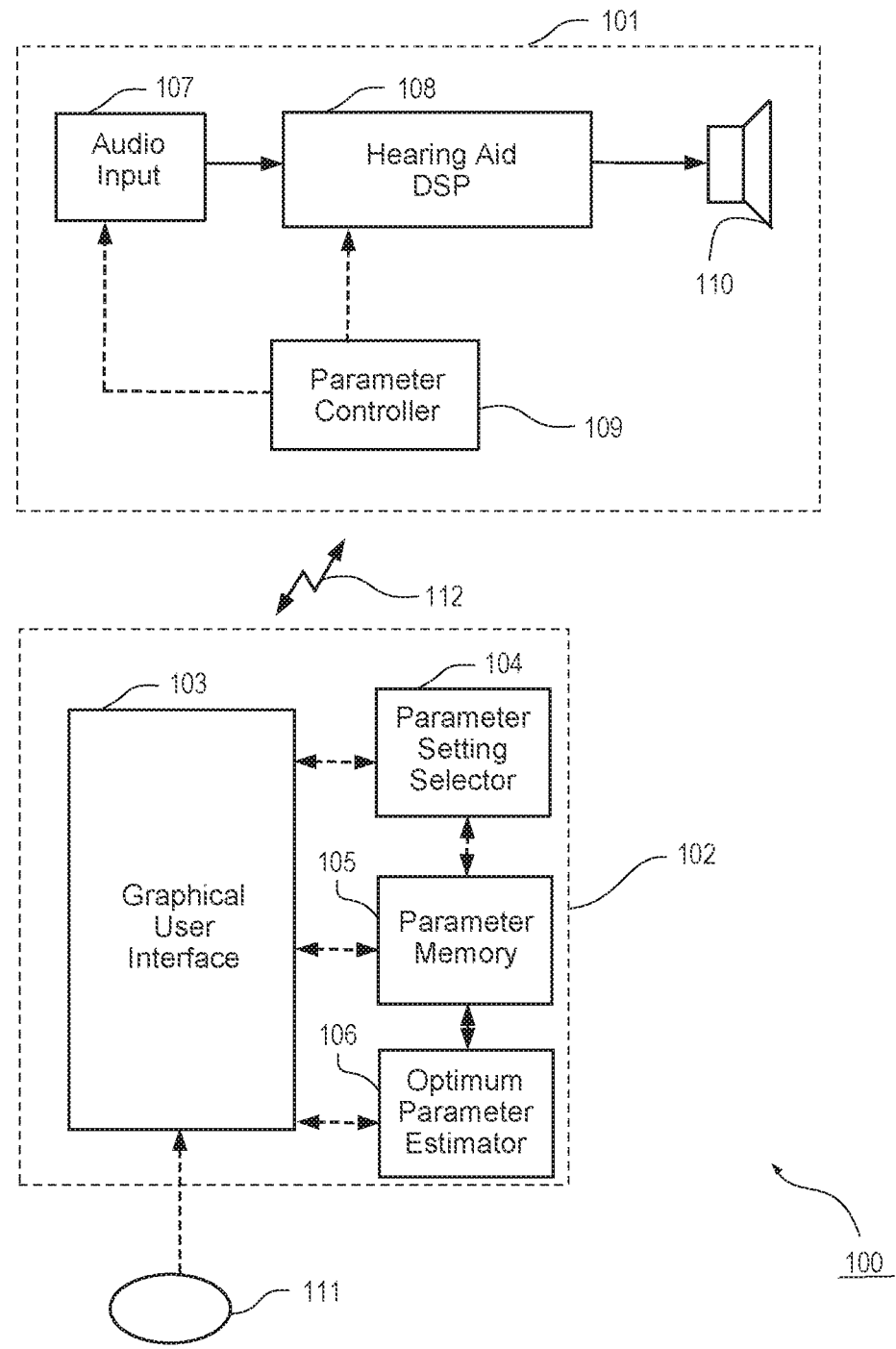

METHOD OF OPTIMIZING PARAMETERS IN A HEARING AID SYSTEM AND A HEARING AID SYSTEM

The present invention relates to a method of optimizing parameters in a hearing aid system. The invention also relates to a hearing aid system adapted for optimizing parameters.

BACKGROUND OF THE INVENTION

Within the context of the present disclosure a hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor adapted to provide amplification in those parts of the audible frequency range where the user suffers a hearing deficit, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore the hearing aid system may comprise an external device, such as a smart phone having software applications adapted to interact with other devices of the hearing aid system. Thus within the present context the term "hearing aid system device" may denote a hearing aid or an external device.

Generally a hearing aid system according to the invention is understood as meaning any system which provides an output signal that can be perceived as an acoustic signal by a user or contributes to providing such an output signal and which has means which are used to compensate for an individual hearing loss of the user or contribute to compensating for the hearing loss of the user. These systems may comprise hearing aids which can be worn on the body or on the head, in particular on or in the ear, and can be fully or partially implanted. However, some devices whose main aim is not to compensate for a hearing loss may nevertheless be considered a hearing aid system, for example consumer electronic devices (televisions, hi-fi systems, mobile phones, MP3 players etc.) provided they have measures for compensating for an individual hearing loss.

It is well known within the art of hearing aid systems that most users will benefit from a hearing aid programming (this process may also be denoted fitting) that takes the user's personal preferences into account. This type of fine tuning or optimization of the hearing aid system settings may also be denoted customization. It is however also well known that the process of customization is a very challenging one.

One problem with customization is that it may be very difficult for a user to explain in words what types of signal processing and the resulting sounds that are preferred.

Customization may generally be advantageous with respect to basically all the various types of signal processing that are carried out in a hearing aid system. Thus customization may be relevant for e.g. noise reduction as well as for classification of the sound environment.

EP-B1-1946609 discloses a method for optimization of hearing aid parameters. The method is based on Bayesian incremental preference elicitation whereby at least one signal processing parameter is adjusted in response to a user adjustment. According to a specific embodiment the user adjustment is simply an indication of user dissent.

EP-B1-1946609 is complicated in so far that it applies a parameterized approach in order to model the user's unknown internal response function (i.e. the user's preference), because it is very difficult to find a suitable parameterized model that suits the great variety of hearing aid system users unknown internal response functions.

Furthermore EP-B1-1946609 is complicated because the processing and memory requirements are very high, especially for hearing aid systems that generally have limited processing and memory resources.

It is therefore a feature of the present invention to provide an improved method of optimizing a hearing aid system setting with respect to both user satisfaction and requirements to processing and memory resources.

It is another feature of the present invention to provide a hearing aid system with improved means for optimizing a hearing aid system setting.

Additionally the inventor has found that internally generated sounds that are used for providing comfort, be it for masking undesired sounds or just for causing a relaxing experience, may benefit significantly from customization.

In the context of the present disclosure, a relaxing sound should be understood as a sound having a quality whereby it is easy to relax and be relieved of e.g. stress and anxiety when subjected to it. Traditional music is one example of relaxing sound while noise is most often used to refer to a sound that is not relaxing.

In the context of the present disclosure, a relaxing sound may especially be understood as a sound adapted for relieving tinnitus.

US-B2-6816599 discloses one type of relaxing sound, that can be generated by a music synthesizer in a way that is very well suited for implementation in e.g. a hearing aid.

U.S. Pat. No. 6,047,074 discloses a hearing aid that can also be utilized for tinnitus therapy, wherein a useful digital signal, derived from the output signal from the hearing aid input transducer, can be evaluated in terms of its intensity, its spectral distribution and/or its time structure such that an oppositely directed (compensating) behavior can be achieved. Hereby the signals for tinnitus therapy can be activated only when no useful signal is present. Arbitrary transition times between end of the useful signal and beginning of the signals for tinnitus therapy can thereby be set. When a longer quiet pause occurs, then the masking signal is slowly mixed in and thus drowns out the disturbing tinnitus noise. It is also disclosed that melodic sound sequences or other tones can be used to mask the tinnitus One problem with generating relaxing sounds is that it may be very difficult for a user to explain in words what type of sounds are perceived as relaxing.

This is especially critical if the user desires to use the relaxing sounds in order to draw his attention away from e.g. a perceived tinnitus tone.

It is therefore a feature of the present invention to provide an improved method for customizing the generation of relaxing sound.

It is another feature of the present invention to provide a hearing aid system with improved means for customizing the generation of relaxing sound.

SUMMARY OF THE INVENTION

The invention, in a first aspect, provides a method according to claim 1.

This provides an improved method for optimizing or customizing parameters in a hearing aid system.

The invention, in a second aspect, provides a method according to claim 18.

This provides an improved method for optimizing or customizing parameters in a hearing aid system.

The invention, in a third aspect, provides a method according to claim 19.

This provides an improved method for optimizing or customizing parameters in a hearing aid system.

The invention, in a third aspect, provides a hearing aid system according to claim 20.

This provides an improved hearing aid system adapted to customize or optimize parameters in a hearing aid system.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings:

FIG. 1 illustrates highly schematically a hearing aid system according to an embodiment of the invention.

DETAILED DESCRIPTION

In the present context the term relaxing sound represents sound that is generated synthetically in a hearing aid in order to help a user to concentrate, to feel more relaxed and comfortable, to reduce stress and to feel less anxious.

In one aspect the relaxing sound can achieve this by masking or by drawing a user's attention away from unwanted and disturbing sounds. In another aspect it has been found that the relaxing sound can by itself help to achieve this independent on whether unwanted and disturbing sounds are present or not.

Generally the inventor has found that it provides a significant improvement for the user if a relaxing sound can be adapted to the user's current preferences (i.e. customized) because the inventor has found that the user's preferences may change significantly up to several times during a day, thus the preferences may depend on the time of day (morning, afternoon or evening) or the user's mood or the type of activity the user is engaged in.

As a consequence of the varying preferences of many users the inventor has also found that it provides a significant improvement for the user if the customization can be carried out without having to spend too much time listening to various types of relaxing sound.

As an additional consequence of the varying preferences of many users the inventor has found that it provides a significant improvement for the user if the customization can be carried out using only the hearing aid system with its limited processing resources, because this allows the customization to be carried out anywhere and at any time.

Furthermore the inventor has found that it is of significant importance that the customization can be carried out without requiring the user to interact with the hearing aid system in a complex manner.

Especially, the inventor has found that analytical expressions allowing hearing aid system customization to be carried out with beforehand unseen processing efficiency can be derived if a hearing aid system user is prompted to compare two hearing aid system settings and rate how much one of the settings is preferred above the other.

As described above the present invention is especially advantageous for customization of relaxing sounds.

One example of artificially generated relaxing sounds that are suitable for implementation in a hearing aid system can be found e.g. in WO-A1-02/41296

Further the inventor has found that artificially generated relaxing sounds such as those disclosed in WO-A1-02/41296 are advantageously customized by optimizing the ranges wherein parameters used to control the generation of sound are allowed to vary pseudo-randomly. However, as one alternative to that customization approach the inventor has found that optimization of the harmonics characteristics of the generated relaxing sounds may provide a significant improvement for the user.

Reference is first made to a method of customizing relaxing sound according to a first embodiment of the invention.

In a first step a set of parameters are selected from the group of parameters that controls generation of relaxing sound by the hearing aid system.

The parameters are selected such that they, when varied over their allowed range, are able to provide a multitude of relaxing sounds that are perceived as having a significant variation.

According to one variation of the present embodiment and having reference to WO-A1-02/41296 the set of parameters comprises the specific harmonics added to the signals generated by a multitude of sound generators according to the embodiments of WO-A1-02/41296. Hereby, the sound generators are customized to provide sound with the harmonic characteristics preferred by the user.

According to another variation of the present embodiment and again having reference to WO-A1-02/41296 the first set of parameters comprises, for one or more sound generators, the allowed range within which the frequency of the sound generator and the fade-out time may vary as controlled by the provided random numbers. Thus the inventor has found that a significant improvement for the user may be provided by customizing the range within which a parameter value is allowed to vary, even though this variation may be randomly controlled.

In a second step a first and second set of parameter values are selected (this may also be denoted the first and second parameter value settings, or just the first and second settings), whereby a first relaxing sound is generated and provided to the user based on the first set of parameter values and a second relaxing sound is generated and provided to the user based on the second set of parameter values. According to the present embodiment the first and second sets of parameter values are selected randomly.

In variations the first and second set of parameter values need not be selected randomly. Instead the first set of parameter values is the set that was active when powering off the hearing aid system. In further variations the first and second parameter value settings may be identical.

Consider now a d-dimensional vector x containing the values of the d selected parameters that controls the generation of relaxing sound by the hearing aid system:

$$x=[x_1, \ldots, x_d]^T$$

In the following a d-dimensional vector x with specific values of the d parameters may also be denoted a setting or a parameter value setting.

In a third step the user is prompted to compare the first and second relaxing sound and provide a first user response (that in the following may also be denoted an observation) that allows a determination of which of the two relaxing sounds the user prefers.

According to the present embodiment the observations comprise a graduated response whereby the user rates how much the first relaxing sound (and hereby the first parameter value setting) is preferred above the second relaxing sound (and hereby the second parameter value setting) by selecting a number from within a bounded range (that may also be denoted an interval) between zero and one, such that a user response of one implies that e.g. the first parameter value setting is indefinitely better than the second parameter value setting and zero implying that the second set is indefinitely better than the first set and that a value of one half implies that the two options are rated to be equally good.

In variations of the present embodiment the bounded range may cover basically any range such as e.g. the range from −1 to +1 or the range from −10 to +10. However, it is emphasized that generally and especially within the present context a test where a user selects either one or another setting can't be considered to provide a user's rating of the settings relative to each other. Thus within the present context when the user response takes the form of a number from a bounded range, then this range (or interval) has more than two elements.

In a fourth step the user provides a multitude of additional user responses based on a multitude of parameter value settings, wherein a set $\mathcal{X}$ of the n tested parameter value settings may be given as:

$$\mathcal{X} = \{x_i \in \mathbb{R}^d : i=1, \ldots, n\}$$

and wherein a vector of m bounded observations are related to pairs of relaxing sounds based on the settings $x_{u_k}$, $x_{v_k} \in \mathcal{X}$, implying that $u_k, v_k \in \{1, \ldots, n\}$, such that:

$$y=[y_1, \ldots, y_m]^T$$

Wherein the bounded observations are of the form $$y_k \in ]a; b[$$

The set $\mathcal{X}^*$ of all $n^*$ possible parameter value settings is expressed as:

$$\mathcal{X}^* = \{x^*_r \in \mathbb{R}^d : r=1, \ldots, n^*\}$$

The user's unknown internal response function is denoted f and is assumed to code the user's perception of a particular sound given the setting x of the parameter values.

$$f: \mathbb{R}^d \to \mathbb{R}, x \mapsto f(x)$$

In the following a (stochastic) vector f is defined as containing the function values $f(x_i)$ for each of the n settings in $\mathcal{X}$ of the user's internal response function f:

$$f=[f(x_1), \ldots, f(x_n)]^T$$

In a fifth step the vector of bounded observations y are warped to a vector of unbounded observations z. This is done using a warping function defined by mapping a bounded, or partly bounded observation, y, to an unbounded observation, z=g(y), with:

$$g: ]a; b[ \to \mathbb{R}, y \mapsto g(y)$$

Suitable functions for carrying out the mapping may be selected from a group of monotonically increasing functions comprising: inverse cumulative distribution function of the Gaussian distribution, inverse sigmoid function and inverse hyperbolic tangent function.

By mapping or warping the observations (in the following these terms may be used interchangeably) in this way the performance of the customization method may be improved both with respect to the speed of convergence (i.e. the number of user responses required to find the parameter value settings that the user prefers) and with respect to robustness (i.e. the chance that the customization method is capable of providing a prediction that reflects the users internal response function). However, it is not a prerequisite for the methods of the present invention that warping is applied.

In a sixth step it is assumed that the warped observations z are given by:

$$z = f(x_u) - f(x_v) + \epsilon$$

wherein $\epsilon$ is Gaussian noise ($\epsilon \sim N(0, \sigma^2)$) that is independent and identically distributed and represents the uncertainty of the user when carrying out the graduated responses.

Based on this assumption the likelihood function for observing z can be determined directly as:

$$p(z_k|f(x_u), f(x_v), \sigma^2) = \mathcal{N}(z_k|f(x_u) - f(x_v), \sigma^2)$$

wherein $z_k$ represents a specific warped user response, wherein $\sigma^2$ represents the variance of the user response and wherein $\mathcal{N}(z_k|f(x_u) - f(x_v), \sigma^2)$ is the single variate Gaussian distribution over the variable $z_k$ with mean value $f(x_u) - f(x_v)$ and variance $\sigma^2$. In the following the variance $\sigma^2$ may also be denoted the likelihood hyper parameter $\theta_{lik}$.

In a seventh step the likelihood is determined using the following new and inventive expression as:

$$p(z|f, \theta_{lik}) = \prod_{k=1}^{m} \mathcal{N}(z_k | f(x_{u_k}) - f(x_{v_k}), \sigma^2) = \mathcal{N}(z | Mf, \sigma^2 I_{m \times m}),$$

wherein $I_{m \times m}$ is an m×m identity matrix, $z=[z_1, \ldots, z_m]^T = [g(y_1), \ldots, g(y_m)]^T$, the matrix M is a m×n matrix, comprising only zeros except for the elements $[M]_{k, u_k} = 1$ and $[M]_{k, v_k} = -1$.

Thus $\mathcal{N}(z|Mf, \sigma^2 I_{m \times m})$ represents a multivariate Gaussian distribution over the set of user responses z with mean vector Mf and covariance matrix $\sigma^2 I_{m \times m}$.

In an eighth step a prior distribution $p(f| \mathcal{X}, \theta_{cov})$ over the function values of the user's unknown internal response function is obtained from a zero-mean Gaussian process. This is obtained based on the fact that a zero-mean Gaussian process defines a joint distribution over a finite set of function values, f, as a multivariate Gaussian distribution $$p(f| \mathcal{X}, \theta_{cov}) = \mathcal{N}(f|0, K)$$

where the covariance between any two function values is given by a positive semi-definite covariance function, $k(x_i, x_j, \theta_{cov})$, such that the covariance matrix K is determined by:

$$K = \begin{bmatrix} k(x_1, x_1, \theta_{cov}) & \dots & k(x_1, x_n, \theta_{cov}) \\ \vdots & \ddots & \vdots \\ k(x_n, x_1, \theta_{cov}) & \dots & k(x_n, x_n, \theta_{cov}) \end{bmatrix}$$

and wherein k is the squared exponential covariance function (that may also be denoted the Gaussian kernel) that is defined as:

$$k(x_i, x_j) = \sigma_f \text{Exp}(-\tfrac{1}{2}(x_i-x_j)^T L^{-1}(x_i-x_j))$$

wherein $\sigma_f$ and the positive semi-definite matrix L are the covariance hyper parameters, that primarily determines the smoothness of the user's internal response function. The covariance hyper parameters $\sigma_f$ and L may together be denoted $\theta_{cov}$.

Generally the prior obtained from a Gaussian Process (that in the following may be abbreviated GP) captures the assumption about the smoothness of the users internal response function f as a function of the parameter value settings x and interplay between the different hearing aid parameters.

It is a fundamental property of a Gaussian process that you can always get the joint distribution of any finite set of function values from a function f(x) modeled by a Gaussian Process. Hence, we can concatenate two vectors containing function values and get the corresponding joint distribution, e.g. as.

$$p\left(\begin{bmatrix} f \\ f_* \end{bmatrix} \middle| \mathcal{X}, \mathcal{X}^*, \theta_{cov}\right) = \mathcal{N}\left(\begin{bmatrix} f \\ f_* \end{bmatrix} \middle| \begin{bmatrix} 0 \\ 0 \end{bmatrix}, \begin{bmatrix} K & K_* \\ K_*^T & K_{**} \end{bmatrix}\right),$$

where:

$$[K_*]_{i,s} = k(x_i, x_s^*, \theta_{cov})$$

$$[K_{**}]_{r,s} = k(x_r^*, x_s^*, \theta_{cov})$$

Wherefrom it is trivial to obtain the conditional distribution of one vector of function values given the other vector. E.g.:

$$p(f^*|f, \mathcal{X}, \mathcal{X}^*, \theta_{cov}) = \mathcal{N}(f^*|K_*^T K^{-1} f, K_{**} - K_*^T K^{-1} K_*)$$

However, in variations of the present embodiment other positive semi-definite covariance functions may be applied instead of the Gaussian kernel. Examples of such covariance functions are the γ-exponential covariance function, the Matern class of covariance functions, the rational quadratic covariance function, periodic covariance functions and linear covariance functions.

In a ninth step the hyper parameters $\theta = \{\theta_{cov}, \theta_{lik}\}$ are selected based on a maximization of the expression for the marginal likelihood, whereby the likelihood of the observed data is also maximized. The marginal likelihood is determined based on the likelihood $p(z|f, \theta_{lik})$ and the prior $p(f|\mathcal{X}, \theta_{cov})$:

$$p(z|\mathcal{X}, \theta) = \int p(z|f, \theta_{lik}) \cdot p(f|\mathcal{X}, \theta_{cov}) \, df \propto$$
$$p(y|\mathcal{X}, \theta)$$

The last proportional sign holds if the warping function is fixed, meaning that it does not contain hyper-parameters that need to be optimized.

Typically a ML-II or MAP-II optimization technique is applied. But in variations of the present embodiment other optimization techniques may be applied as well.

When applying the ML-II method then the maximization of the marginal likelihood with respect to the hyper parameters is achieved by minimizing the negative log marginal likelihood with respect to the hyper parameters:

$$\theta_{ML-II} = \underset{\theta}{\text{argmax}}\, p(z|\mathcal{X}, \theta) = \underset{\theta}{\text{argmax}}(-\log p(z|\mathcal{X}, \theta))$$

According to a variation of the present embodiment a method known as MAP-II may be applied, wherein the marginal likelihood is regularized with a suitable hyper prior distribution, $p(\theta)$, such as e.g. the half-student's-t distribution, the Gamma distribution, the Laplace distribution, the Gaussian distribution or a uniform prior for noise parameters.

Subsequently the regularized marginal likelihood is maximized with respect to $p(\theta|z, \mathcal{X}) \propto p(z|\mathcal{X}, \theta)p(\theta)$ by finding the minimum of the negative logarithmic. Thus the MAP-II optimization is given by:

$$\theta_{MAP-II} = \underset{\theta}{\text{argmax}}\, p(z|\mathcal{X}, \theta)p(\theta) = \underset{\theta}{\text{argmax}}\left(-\log p(z|\mathcal{X}, \theta) - \log p(\theta)\right) =$$

$$\underset{\theta}{\text{argmax}}\left(\frac{1}{2}\log \det(MKM^T + \sigma^2 I_{m \times m}) + \frac{1}{2}z^T(MKM^T + \sigma^2 I_{m \times m})^{-1}z - \log p(\theta)\right),$$

The inventor has found that this method is especially advantageous when fewer than say 50 observations are available, which is typically the case when customizing hearing aid systems.

A new analytical expression for the marginal likelihood is derived by marginalizing the joint distribution between function values and observations over the function values. This joint distribution is the product of the likelihood and the prior hereby providing:

$$p(z|\mathcal{X}, \theta) = \mathcal{N}(z|0, MKM^T + \sigma^2 I_{m \times m})$$

When using the marginal likelihood for either MAP-II or ML-II optimization of hyper parameters it is typically more numerically robust to minimize the negative logarithmic of the marginal likelihood:

$$-\log p(z|\mathcal{X}, \theta) =$$
$$\frac{m}{2}\log 2\pi + \frac{1}{2}\log \det(MKM^T + \sigma^2 I_{m \times m}) + \frac{1}{2}z^T(MKM^T + \sigma^2 I_{m \times m})^{-1}z$$

or if considering the original non-warped observations $\mathcal{Y}$:

$$-\log p(y|\mathcal{X}, \theta) = \frac{m}{2}\log 2\pi + \frac{1}{2}\log \det(MKM^T + \sigma^2 I_{m \times m}) +$$
$$\frac{1}{2}z^T(MKM^T + \sigma^2 I_{m \times m})^{-1}z - \sum_{k=1}^{m} \log \left.\frac{\partial g(y)}{\partial y}\right|_{y_k}$$

Note, that the last term appended for the negative log marginal likelihood of y is the Jacobian, and that the Jacobian does not depend on the hyper parameters, if the warping is fixed. Therefore, the Jacobian does not influence the gradient ascend/descend optimization of hyper parameters, and can therefore be neglected when performing the ML-II or MAP-II optimization of hyper parameters.

According to a variation of the present embodiment the warping function is the inverse cumulative density function of the Gaussian distribution, $\Phi^{-1}$ (y), in which case the Jacobian term is easily found as:

$$g(y) = \Phi^{-1}(y) \Longrightarrow \frac{\partial g(y)}{\partial y} = \frac{1}{\mathcal{N}(\Phi^{-1}(y) | 0, 1)}$$

Thus the inventor has derived an analytical expression for the negative logarithmic of the marginal likelihood and hereby also the gradient of the negative logarithmic of the marginal likelihood with respect to the hyper parameters whereby the hyper parameters may be determined in a very processing efficient manner.

However, in variations of the present embodiment the hyper parameters of the covariance and likelihood may simply be set using experience from similar situations to provide a qualified guess. In a specific variation the hyper parameters are set based on experience from other hearing aid system users.

In other variations the warping function may contain hyper parameters.

In a tenth step an analytical posterior distribution over the unknown function values of the user's internal response function p(f|z, $\mathcal{X}$, θ) is derived based on Bayes rule:

$$p(f | z, \mathcal{X}, \theta) = \frac{p(z | f, \theta_{lik}) \cdot p(f | \mathcal{X}, \theta_{cov})}{p(z | \mathcal{X}, \theta)}$$

By applying the novel pairwise Gaussian likelihood given previously, the prior derived using a Gaussian process and the marginal likelihood as the integral over the user's internal response function of the product of the likelihood and the prior, then an analytical expression for the posterior can be found as:

$$p(f | z, \mathcal{X}, \theta) = \mathcal{N}(f | \mu, \Sigma)$$
$$\mu = K(M^T M K + \sigma^2 I_{n \times n})^{-1} M^T z$$
$$\Sigma = \left(K^{-1} + \frac{1}{\sigma^2} M^T M\right)^{-1}$$

In an eleventh step an analytical expression for the predictive distribution over the unknown function values of the user's internal response function is found. In full Bayesian modeling, predictions come in terms of a predictive distribution of new function values, $f^* = [f(x^*_1), \ldots, f(x^*_{n*})]^T$ given the observations, y or in case of warped observations z. Hence, the predictive distribution is a conditional distribution and the conditional is on the observations only. It is derived from $$p(f^*|z, \mathcal{X}, \mathcal{X}^*, \theta) =$$
$$\int p(f^*|f, \mathcal{X}, \mathcal{X}^*, \theta_{cov}) p(f|z, \mathcal{X}, \theta) df$$

Note, that p(f*|f, $\mathcal{X}$, $\mathcal{X}$*, $\theta_{cov}$) is Gaussian due to the Gaussian Process as already discussed previously with reference to the eight step. Since the posterior distribution, according to the present embodiment is a Gaussian distribution on the form p(f|z, $\mathcal{X}$, θ)=$\mathcal{N}$(f|μ, Σ), then the solution to the integral has an analytical solution and the predictive distribution is given, by inserting the mean and covariance from the posterior distribution, hereby obtaining:

$$p(f^* | z, \mathcal{X}, \mathcal{X}^*, \theta) = \int p(f^* | f, \mathcal{X}, \mathcal{X}^*, \theta_{cov}) p(f | z, \mathcal{X}, \theta) df$$
$$= \int \mathcal{N}(f^* | K_*^T K^{-1} f, K_{**} - K_*^T K^{-1} K_*) \cdot \mathcal{N}(f | \mu, \Sigma) df$$
$$= \mathcal{N}(f^* | K_*^T K^{-1} \mu, K_{**} - K_*^T (K^{-1} + K^{-1} \Sigma K^{-1}) K_*^T)$$
$$= \mathcal{N}(f^* | K_*^T (M^T M K + \sigma^2 I_{n \times n})^{-1} M^T z, K_{**} -$$
$$K_*^T (M^T M K + \sigma^2 I_{n \times n})^{-1} M^T M K_*)$$

where:

$$K_* = \begin{bmatrix} k(x_1, x_1^*, \theta_{cov}) & \cdots & k(x_1, x_{n*}^*, \theta_{cov}) \\ \vdots & \ddots & \vdots \\ k(x_n, x_1^*, \theta_{cov}) & \cdots & k(x_n, x_{n*}^*, \theta_{cov}) \end{bmatrix}$$

and:

$$K_{**} = \begin{bmatrix} k(x_1^*, x_1^*, \theta_{cov}) & \cdots & k(x_1^*, x_{n*}^*, \theta_{cov}) \\ \vdots & \ddots & \vdots \\ k(x_{n*}^*, x_1^*, \theta_{cov}) & \cdots & k(x_{n*}^*, x_{n*}^*, \theta_{cov}) \end{bmatrix}$$

Consider now the mean vector of the predictive distribution and denote it μ*, which from the expressions above is given by $$\mu^* = K_*^T (M^T M K + \sigma^2 I_{n \times n})^{-1} M^T z$$

wherefrom it directly follows that only the term K* depends on the parameter value settings belonging to $\mathcal{X}$*.

In a twelfth step the parameter value setting, that the user prefers among all possible settings (i.e. the set $\mathcal{X}$*) can be found by considering a case where $\mathcal{X}$* contains only one setting, x*, implying that n*=1, whereby we get:

$$K_* = [k(x^*, x_1, \theta_{cov}), \ldots, k(x^*, x_n, \theta_{cov})]^T = k(x^*)$$

This is a function, which takes a single input x* and returns a vector of covariance function outputs for every tested parameter value setting, $x_i$. Thereby, we can interpret the mean value of the predictive distribution as a function of a single parameter value setting that returns the corresponding mean function value as $$\mu^*(x^*) = k(x^*)^T (M^T M K + \sigma^2 I_{n \times n})^{-1} M^T z = k(x^*)^T \cdot B,$$

where the matrix B does not depend on x*.

This interpretation of the mean value as function taking a single input makes it possible to find the (local) maximum of the mean of the predictive distribution with respect to the input, x*, using the gradient given by:

$$\frac{\partial \mu^*(x^*)}{\partial x^*} = \left[\frac{\partial k_*(x^*)}{\partial x^*}\right]^T (M^T M K + \sigma^2 I_{n \times n})^{-1} M^T z.$$

Thus it follows that the present invention offers an estimate of the parameter value setting that the user prefers, among all the possible parameter value settings, wherein the estimate can be provided using only very limited processing and memory resources due to the availability of an analytical expression for the gradient.

However, according to a variation of the present embodiment the parameter value setting that the user prefers, among the tested settings, can be found by considering that in this case the parameter value settings in the set $\mathcal{X}$* are the same as the settings that have been presented to the user (i.e. the settings belonging to $\mathcal{X}$) and consequently we have:

$$K_* = \begin{bmatrix} k(x_1, x_1, \theta_{cov}) & \cdots & k(x_1, x_n, \theta_{cov}) \\ \vdots & \ddots & \vdots \\ k(x_n, x_1, \theta_{cov}) & \cdots & k(x_n, x_n, \theta_{cov}) \end{bmatrix} = K$$

and consequently:

$$\mu^* = K_*^T (M^T M K + \sigma^2 I_{n \times n})^{-1} M^T z = K(M^T M K + \sigma^2 I_{n \times n})^{-1} M^T z$$

Hereby an estimate of the parameter value setting that the user prefers can be found with a method that requires even fewer processing and memory resources than the present embodiment, because the set $\mathcal{X}$ is typically of limited size and therefore can be found without a gradient approach.

However, according to the present embodiment, the settings that the user is prompted to compare are not selected randomly. Instead the next new setting, to be compared with the current best parameter value setting $\hat{x}$, is found as the parameter value setting $\hat{x}^*$ that maximizes a new bivariate Expected Improvement, given by:

$$\hat{x}^* = \underset{x^*}{\mathrm{argmax}}\left(\mu_I \Phi\left(\frac{\mu_I}{\sigma_I}\right) + \sigma_I \mathcal{N}\left(\frac{\mu_I}{\sigma_I} \mid 0, 1\right)\right),$$

wherein $$\mu_I = (k_*(x^*) - k_*(\hat{x})) \cdot (M^T M K + \sigma^2 I_{n \times n})^{-1} M^T z,$$

$$\sigma_I^2 =$$
$$k(x^*, x^*) + k(\hat{x}, \hat{x}) - k(x^*, \hat{x}) - k_*(x^*)^T (M^T M K + \sigma^2 I_{n \times n})^{-1} M^T M k_*(x^*) -$$
$$k_*(\hat{x})^T (M^T M K + \sigma^2 I_{n \times n})^{-1} M^T M k_*(\hat{x}) -$$
$$k_*(x^*)^T (M^T M K + \sigma^2 I_{n \times n})^{-1} M^T M k_*(\hat{x}),$$

and:

$$k_*(x) = [k(x, x_i), \ldots, k(x, x_n)]$$

and wherein $$\Phi\left(\frac{\mu_I}{\sigma_I}\right)$$

is the standard cumulative distribution function of the Gaussian distribution.

It is a further specific advantage of the analytical expression for the bivariate Expected Improvement that it allows an analytical expression for the gradient of the bivariate Expected improvement to be derived:

$$\frac{\partial}{\partial x^*}\left\{\mu_I \Phi\left(\frac{\mu_I}{\sigma_I}\right) + \sigma_I \mathcal{N}\left(\frac{\mu_I}{\sigma_I} \mid 0, 1\right)\right\} = \frac{\partial \sigma_I}{\partial x^*} \mathcal{N}\left(\frac{\mu_I}{\sigma_I} \mid 0, 1\right) + \frac{\partial \mu_I}{\partial x^*} \Phi\left(\frac{\mu_I}{\sigma_I}\right),$$

Where $$\frac{\partial \mu_I}{\partial x^*} = \left[\frac{\partial k_*(x^*)}{\partial x^*}\right]^T (M^T M K + \sigma^2 I_{n \times n})^{-1} M^T z$$

and $$\frac{\partial \sigma_I}{\partial x^*} = \frac{1}{\sigma_I}\left(\frac{1}{2}\frac{\partial k(x^*, x^*)}{\partial x^*} - \left[\frac{\partial k_*(x^*)}{\partial x^*}\right]^T (M^T M K + \sigma^2 I_{n \times n})^{-1} M^T M k_*(x^*) - \frac{\partial k(x^*, \hat{x})}{\partial x^*} + \left[\frac{\partial k_*(x^*)}{\partial x^*}\right]^T (M^T M K + \sigma^2 I_{n \times n})^{-1} M^T M k_*(\hat{x})\right)$$

When deriving the new analytical expression for the bivariate Expected Improvement the inventor has considered that when using a Gaussian Process to model the function value, f(x*), of a new (i.e. not yet tested) parameter value setting x*, then the function value of the new parameter value setting, x*, co-varies with the function value, f($\hat{x}$), at the current maximum, $\hat{x}$. The original and well known (uni-variate) Expected Improvement formulation (which in the following may be referred to as simply EI) does not consider this. Instead, the EI formulation requires the, f($\hat{x}$), to be deterministically defined. Consequently, when using EI with Gaussian Processes the mean function value at the maximum point $\hat{\mu}$ is used as the deterministic prediction of the corresponding function value, f($\hat{x}$), thus neglecting both the variance, $\hat{\sigma}^2$, and covariance with the function value for the new parameter value setting available from the predictive distribution from the eleventh step. In a very common scenario, this has the undesirable consequence that among all possible new parameter value settings, x*, the parameter value setting with the largest EI is the setting that is arbitrarily close to the current maximum, $\hat{x}$. Thereby, the EI criterion will end up suggesting points arbitrarily close to the current maximum, only because the covariance is neglected. The bivariate Expected Improvement designed by the inventor avoids this undesirable behavior, because the covariance is included.

On the downside, the bivariate Expected Improvement approach requires the entire covariance matrix of the predictive distribution, from the eleventh step, to be computed and stored. With only a small number of parameters, say more than three, the size of the covariance matrix will be way too big to be stored in a hearing aid system memory, even with tens of GB of available memory. Therefore it is of significant importance that the inventor has provided an analytical expression for the bivariate Expected Improvement because this allows it to be maximized with a gradient ascend procedure, which does not require the entire covariance matrix to be computed and stored.

In variations of the first embodiment the next new setting needs not be determined using the new and inventive bivariate Expected Improvement method. Instead the next new setting may be determined using a single variate Expected Improvement method.

In other variations of the first embodiment the inventor has found that any customization of hearing aid system settings may benefit from the disclosed method.

Reference is now made to a method of customizing parameters in a hearing aid system according to a second embodiment of the invention.

In a first step a multitude of hearing aid system parameters are selected for user customization. According to the present embodiment the hearing aid system comprises a graphical user interface that allows the user to select the parameters to be customized. In variations of the present embodiment the hearing aid system is adapted such that the user is offered to select from a menu whether to customize e.g. noise reduction or relaxing sounds and the hearing aid system will in response to the user's selection select appropriate parameters to be customized and the ranges within which the parameters are allowed to vary.

In a second step the user is prompted to compare the acoustical output from the hearing aid system as a function of two different parameter value settings and provide a user response representing the user's rating of the two different parameter value settings relative to each other. According to the present embodiment the hearing aid system comprises a graphical user interface that allows the user to input his rating.

In a third step a multitude of user responses and corresponding parameter value settings are stored, at least temporary in a memory of the hearing aid system and subsequently the parameter value settings used to determine a covariance matrix K, of size n×n wherein n is the number of tested parameter value settings given as:

$$K = \begin{bmatrix} k(x_1, x_1) & \ldots & k(x_1, x_n) \\ \vdots & \ddots & \vdots \\ k(x_n, x_1) & \ldots & k(x_n, x_n) \end{bmatrix}$$

wherein k is a positive semi-definite covariance function such as the squared exponential covariance function, and $x_1$, $x_2, \ldots, x_d$ are vectors representing different parameter value settings.

In a fourth step a matrix M is provided, of size m×m, where m is the number of provided user responses, wherein M comprises only zero's except for $[M]_{k,u_k}=1$ and $[M]_{k,v_k}=-1$, and wherein index k represents the k'th user response and indices $u_k$ and $v_k$ represents the parameter value settings used to prompt the k'th user response.

According to a variation of the present embodiment the parameter value setting, that the user prefers $\hat{x}$, among the tested parameter value settings, is given as:

$$\hat{x} = \underset{x}{\operatorname{argmax}}\, K^T(M^T M K + \sigma^2 I_{n \times n})^{-1} M^T z$$

wherein $\sigma^2$ is Gaussian noise that is independent and identically distributed and represents the uncertainty of the user when carrying out the graduated responses and wherein z is a vector derived from the provided user responses.

According to the present embodiment $\sigma^2$ is determined based on a MAP-II optimization as explained in detail for the first embodiment of the present invention and the vector z is derived from the vector y of bounded user responses, also as explained in detail for the first embodiment of the present invention.

Reference is now made to FIG. 1, which illustrates highly schematically a hearing aid system 100 according to a third embodiment of the invention. The hearing aid system 100 comprises a hearing aid 101 and an external device 102. The external device 102 comprises a graphical user interface 103, a parameter setting selector 104, a parameter memory 105 and an optimum parameter estimator 106. The hearing aid 101 comprises an audio input 107, a hearing aid digital signal processor (DSP) 108, a parameter controller 109 and an electrical-acoustical output transducer 110.

Firstly the graphical user interface 103 is adapted to allow a hearing aid system user 111 to select a number of hearing aid parameters for customization to the hearing aid system user's preference. The parameter memory 105 holds information, on the parameters that may be selected for customization, such as the ranges wherein the parameters are allowed to vary.

The parameter setting selector 104 comprises an algorithm that allows the next two parameter value settings that are to be rated by the hearing aid user 111 to be determined, and the parameter setting selector 104 is further adapted to provide said two parameter value settings to be transmitted to the parameter controller 109 of the hearing aid 101.

The parameter controller 109 is adapted to control either the audio input 107, in case sound is to be generated synthetically in the hearing aid or the hearing aid digital signal processor 108, in case the hearing aid DSP 108 uses the parameters to be rated when processing sound from the audio input 107.

The audio input 107 may either provide synthetically generated electrical signals representing e.g. relaxing sounds or may relay signals received from one or more acoustical-electrical transducers.

The hearing aid DSP 108 is adapted to process the electrical signals representing sounds that are received from the audio input 107 and provide the processed signals to the electrical-acoustical transducer 110, in order to alleviate a hearing loss by amplifying sound at frequencies in those parts of the audible frequency range where the user suffers a hearing deficit.

The optimum parameter estimator 106 is adapted to estimate the parameter value setting that the hearing aid system user 111 prefers based on the user response provided by the hearing aid system user 111 and the parameter value settings evaluated as described in great detail with reference to the previous embodiments. The optimum parameter estimator 106 is furthermore adapted to provide the preferred parameter setting to the hearing aid, in order to adjust the parameter setting in the hearing aid and hereby finalizing the customization process, This may be done in response to a user input triggering this, in response to the user having carried out a predetermined number of ratings or in response to some other convergence criteria being fulfilled.

According to variations of the previous embodiments the customization process is deemed to have converged when the combined magnitude of the Expected Improvement for a plurality of at least pseudo-randomly selected parameter value settings are below a predetermined threshold.

Generally the variations, mentioned in connection with a specific embodiment, may, where applicable, be considered variations for the other disclosed embodiments as well.

This is especially true with respect to the fact that the disclosed methods may be used for any type of optimization (i.e. customization) of hearing aid system settings.

This is also true with respect to the methods of selecting the values of the hyper parameters for both the covariance and likelihood functions.

Furthermore this is true with respect to whether mapping (that may also be denoted warping) techniques are applied.

This is likewise true for the methods for determining the next parameter value settings to be rated by the user. The present invention does not depend on a specific method for determining the next parameter value setting, although the new and inventive bivariate Expected Improvement method may be significantly advantageous.

It is likewise independent on a specific embodiment whether the parameters to be customized are used to control how sound is processed in the hearing aid system or whether they are used to control how sound is synthetically generated by the hearing aid system.

Thus e.g. how the hearing aid system parameters are provided or offered or selected for user customization does not depend on a specific embodiment. Neither does the method of providing the user response depend on a specific embodiment.

In the present context the distributions over the unknown function values of the user's internal response function are primarily expressed such that the hyper parameters appear explicitly. However, in case this is not the case everywhere the hyper parameters are obviously assumed to be implicitly disclosed.

The invention claimed is:

1. A method of optimizing parameters in a hearing aid system comprising the steps of:
   providing a set of parameters $x_1, x_2, \ldots, x_d$ to be optimized;
   providing a first sound based on a first parameter value setting $x_1=[x_{11}, x_{21}, \ldots, x_{d1}]$ and providing a second sound based on a second parameter value setting $x_2=[x_{12}, x_{22}, \ldots, x_{d2}]$;
   prompting a user to rate said first and second sounds relative to each other;
   providing a user response $y_1$ representing the user's rating of the two sounds relative to each other;
   providing m user responses $y=[y_1, y_2, \ldots, y_m]$ wherein each of the user responses represent the user's rating of two sounds relative to each other and wherein the sounds are derived from a multitude of n parameter value settings $x_1, x_2, \ldots, x_n$;
   defining a likelihood function as:

$p(y_k|f(x_u), f(x_v), \sigma)$ wherein $f(x_u)$ and $f(x_v)$ represent specific function values of the user's internal response function f, wherein $y_k$ represents a specific user response and wherein σ represents the noise of the user response;
   defining the likelihood as:

$$p(y \mid f) = \prod_{k=1}^{m} p(y_k \mid f(x_u), f(x_v), \sigma)$$

wherein the likelihood represents a multivariate distribution over the user responses y;
   obtaining a prior distribution over the function values of the user's internal response function;
   using Bayes rule to obtain an analytical posterior distribution over the function values of the user's internal response function;
   deriving an analytical expression for the predictive distribution based on the analytical expression of the posterior distribution over the function values of the user's internal response function; and
   using the analytical expression for the predictive distribution to find the parameter value settings that the user prefers.

2. The method according to claim 1, wherein the likelihood function is Gaussian and defined as:

$p(y_k|f(x_u),f(x_v), \sigma)=\mathcal{N}(y_k|f(x_u)-f(x_v), \sigma^2)$ wherein $\mathcal{N}(y_k|f(x_u)-f(x_v), \sigma^2)$ is the single variate Gaussian distribution over the variable $y_k$ with mean value $f(x_u)-f(x_v)$ and variance $\sigma^2$,
   wherein the likelihood is defined as:

$$p(y \mid f) = \prod_{k=1}^{m} \mathcal{N}(y_k \mid f(x_u) - f(x_v), \sigma^2) = \mathcal{N}(y \mid Mf, \sigma^2 I)$$

wherein $\mathcal{N}(y|Mf, \sigma^2 I_{m \times m})$ represents a multivariate Gaussian distribution with mean vector Mf and covariance matrix $\sigma^2 I$, wherein I is a m×m identity matrix, and M is a m×n matrix having only zero elements except for the elements $[M]_{k,u_k}=1$ and $[M]_{k,v_k}=-1$;
   wherein the prior distribution over the function values of the user's internal response function is obtained using a Gaussian process.

3. The method according to claim 1, wherein the user response takes the form of a number from a bounded or partly bounded interval.

4. The method according to claim 1, wherein the user response is modelled in accordance with $y_k=f(x_{u_k})-f(x_{v_k})+\varepsilon$,
   wherein $y_k$ is the user response, $f(x_{u_k})$ and $f(x_{v_k})$ are function values of the internal response function of the user for two different parameter value settings $x_{u_k}$ and $x_{u_k}$ and wherein ε is assumed to be identically and independently distributed noise.

5. The method according to claim 1, wherein said prior distribution over the function values of the user's internal response function is given as: $p(f| \mathcal{X})=\mathcal{N}(f|0, K)$, wherein $\mathcal{X}$ is a set of the n tested parameter value settings and wherein K is a covariance matrix.

6. The method according to claim 5, wherein the covariance matrix K is determined from: $[K]_{i,j}=k(x_i, x_j)$, wherein k is a positive semi-definite covariance function selected from a group of functions comprising the squared exponential covariance function, the γ-exponential covariance function, the Matern class of covariance functions, the rational quadratic covariance function, periodic covariance functions and linear covariance functions.

7. The method according to claim 2, wherein the analytical expression for the posterior distribution over the function values of the user's internal response function is given as:

$$p(f \mid y, \mathcal{X}) = \mathcal{N}(f \mid \mu, \Sigma)$$
$$\mu = K(M^T M K + \sigma^2 I_{n \times n})^{-1} M^T y$$
$$\Sigma = \left(K^{-1} + \frac{1}{\sigma^2} M^T M\right)^{-1}.$$

8. The method according to claim 2, wherein the analytical expression for the predictive distribution is given as:

$$\mathcal{N}(f^* \mid K_*^T (M^T M K + \sigma^2 I_{n \times n})^{-1} M^T y, K_{**} - K_*^T (M^T M K + \sigma^2 I_{n \times n})^{-1} M^T M K_*)$$

where:

$$K_* = \begin{bmatrix} k(x_1, x_1^*, \theta_{cov}) & \cdots & k(x_1, x_{n^*}^*, \theta_{cov}) \\ \vdots & \ddots & \vdots \\ k(x_n, x_1^*, \theta_{cov}) & \cdots & k(x_n, x_{n^*}^*, \theta_{cov}) \end{bmatrix}$$

and:

$$K_{**} = \begin{bmatrix} k(x_1^*, x_1^*, \theta_{cov}) & \cdots & k(x_1^*, x_{n^*}^*, \theta_{cov}) \\ \vdots & \ddots & \vdots \\ k(x_{n^*}^*, x_1^*, \theta_{cov}) & \cdots & k(x_{n^*}^*, x_{n^*}^*, \theta_{cov}) \end{bmatrix}$$

wherein $\theta_{cov}$ and $\theta_{lik}$ are hyper parameters for the covariance and likelihood.

9. The method according to claim 2, wherein the step of providing a set of user responses comprises the step of determining the next parameter value settings to be rated by the user using an analytical expression for the bivariate expected improvement.

10. The method according to claim 9, wherein the analytical expression for the bivariate expected improvement is given by:

$$\mu_I \Phi\left(\frac{\mu_I}{\sigma_I}\right) + \sigma_I \mathcal{N}\left(\frac{\mu_I}{\sigma_I} \mid 0, 1\right)$$

wherein $$\mu_I = (k, (x^*) - k, (\hat{x})) \cdot (M^T M K + \sigma^2 I_{n \times n})^{-1} M^T y$$

wherein $$\mu_I = (k, (x^*) - k, (\hat{x})) \cdot (M^T M K + \sigma^2 I_{n \times n})^{-1} M^T y,$$

$$\sigma_I^2 =$$

$$k(x^*, x^*) + k(\hat{x}, \hat{x}) - k(x^*, \hat{x}) - k_*(x^*)^T (M^T MK + \sigma^2 I_{n \times n})^{-1} M^T M k_*(x^*) -$$

$$k_*(\hat{x})^T (M^T MK + \sigma^2 I_{n \times n})^{-1} M^T M k_*(\hat{x}) -$$

$$k_*(x^*)^T (M^T MK + \sigma^2 I_{n \times n})^{-1} M^T M k_*(\hat{x})$$

and:

$$k_*(x) = [k(x, x_i), \ldots, k(x, x_n)]$$

and wherein $$\Phi\left(\frac{\mu_I}{\sigma_I}\right)$$

is the standard Gaussian cumulative distribution function.

11. The method according to claim 9, wherein an analytical expression for the gradient of the bivariate expected improvement as a function of a new parameter value setting is used to find a maximum of the bivariate expected improvement as a function of the set of parameter values using a gradient ascend or descend approach.

12. The method according to claim 11, wherein the analytical expression for the gradient of the bivariate expected improvement as a function of the set of parameter values is given as:

$$\frac{\partial}{\partial x^*}\left\{\mu_I \Phi\left(\frac{\mu_I}{\sigma_I}\right) + \sigma_I \mathcal{N}\left(\frac{\mu_I}{\sigma_I} \mid 0, 1\right)\right\} = \frac{\partial \sigma_I}{\partial x^*} \mathcal{N}\left(\frac{\mu_I}{\sigma_I} \mid 0, 1\right) + \frac{\partial \mu_I}{\partial x^*} \Phi\left(\frac{\mu_I}{\sigma_I}\right),$$

where:

$$\frac{\partial \mu_I}{\partial x^*} = \left[\frac{\partial k_*(x^*)}{\partial x^*}\right]^T (M^T MK + \sigma^2 I_{n \times n})^{-1} M^T y$$

and:

$$\frac{\partial \sigma_I}{\partial x^*} = \frac{1}{\sigma_I}\left(\frac{1}{2}\frac{\partial k(x^*, x^*)}{\partial x^*} - \left[\frac{\partial k_*(x^*)}{\partial x^*}\right]^T (M^T MK + \sigma^2 I_{n \times n})^{-1} M^T M k_*(x^*) - \frac{\partial k(x^*, \hat{x})}{\partial x^*} + \left[\frac{\partial k_*(x^*)}{\partial x^*}\right]^T (M^T MK + \sigma^2 I_{n \times n})^{-1} M^T M k_*(\hat{x})\right).$$

13. The method according to claim 1, comprising the steps of:
determining covariance and likelihood hyper parameters $\theta_{cov}$ and $\theta_{lik}$ by applying a ML-II or MAP-II optimization on the marginal likelihood.

14. The method according to claim 2, wherein the step of determining likelihood and covariance hyper parameters comprises finding the minimum of the negative logarithmic regularized marginal likelihood, as a function of the hyper parameters, given by:

$$\operatorname*{argmin}_{\theta}\left(\frac{1}{2}\log\det(MKM^T + \sigma^2 I_{m \times m}) + \frac{1}{2}y^T(MKM^T + \sigma^2 I_{m \times m})^{-1} y - \log p(\theta)\right)$$

wherein $p(\theta)$ is a suitable hyper prior distribution.

15. The method according to claim 1, wherein the parameters to be optimized comprises parameters for controlling the generation of relaxing sounds.

16. The method according to claim 1, comprising the step of:
mapping the user responses from a first response range that is bounded or partly bounded and to a second response range that is unbounded.

17. The method according to claim 16, wherein the step of mapping the set of user responses is adapted such that the user responses becomes more Gaussianly distributed in the second response range.

18. The method according to claim 16, wherein the step of mapping the user responses is carried out using a monotonically increasing function selected from a group of functions comprising the inverse cumulative distribution function of the Gaussian distribution, inverse sigmoid function and inverse hyperbolic tangent function.

19. A method of optimizing parameters in a hearing aid system comprising the steps of:
providing a set of parameters $x_1, x_2, \ldots, x_d$ to be optimized;
providing a first sound based on a first parameter value setting $x_1=[x_{11}, x_{21}, \ldots, x_{d1}]$ and providing a second sound based on a second parameter value setting $x_2=[x_{12}, x_{22}, \ldots, x_{d2}]$;
prompting a user to rate said first and second sounds relative to each other;
providing a user response $y_1$ representing the user's rating of the two sounds relative to each other;
providing m user responses $y=[y_1, y_2, \ldots, y_m]$ wherein each of the user responses represent the user's rating of two sounds relative to each other and wherein the sounds are derived from a multitude of n parameter value settings $x_1, x_2, \ldots, x_n$;
obtaining a matrix K as:

$$K = \begin{bmatrix} k(x_1, x_1) & \ldots & k(x_1, x_n) \\ \vdots & \ddots & \vdots \\ k(x_n, x_1) & \ldots & k(x_n, x_n) \end{bmatrix}$$

wherein k is a positive semi-definite covariance function,
obtaining a matrix M, that is a m×n matrix comprising only zero's except for: $[M]_{k,u_k}=1$ and $[M]_{k,v_k}=-1$;
determining the parameter value setting, that the user prefers $\hat{x}$, among the tested parameter value settings as:

$$\hat{x} = \operatorname*{argmax}_{x} K^T (M^T MK + \sigma^2 I_{n \times n})^{-1} M^T y$$

and wherein $\sigma^2$ is Gaussian noise that is independent and identically distributed and represents the uncertainty of the user when carrying out the graduated responses.

20. A method of optimizing parameters in a hearing aid system comprising the steps of:
providing a set of parameters $x_1, x_2, \ldots, x_d$ to be optimized;

providing a first sound based on a first parameter value setting $x_1=[x_{11}, x_{21}, \ldots, x_{d1}]$ and providing a second sound based on a second parameter value setting $x_2=[x_{12}, x_{22}, \ldots, x_{d2}]$;

prompting a user to rate said first and second sounds relative to each other;

providing a user response $y_1$ representing the user's rating of the two sounds relative to each other;

providing m user responses $y=[y_1, y_2, \ldots, y_m]$ wherein each of the user responses represent the user's rating of two sounds relative to each other and wherein the sounds are derived from a multitude of n parameter value settings $x_1, x_2, \ldots, x_n$;

obtaining a matrix K as:

$$K = \begin{bmatrix} k(x_1, x_1) & \ldots & k(x_1, x_n) \\ \vdots & \ddots & \vdots \\ k(x_n, x_1) & \ldots & k(x_n, x_n) \end{bmatrix}$$

wherein k is a positive semi-definite covariance function, obtaining a matrix M, that is a m×n matrix comprising only zero's except for: $[M]_{k,u_k}=1$ and $[M]_{k,v_k}=-1$;

determining the parameter value setting, that the user prefers, among all possible parameter value settings x* using the mean value of the predictive distribution $\mu^*(x^*)$ as function of a single parameter value setting:

$\mu^*(x^*)=k(x^*)^T(M^TMK+\sigma^2 I_{n \times n})^{-1}M^T y$ wherein $k(x^*)=[k(x^*, x_1, \theta_{cov}), \ldots, k(x^*, x_n, \theta_{cov})]^T$ wherein $\theta_{cov}$ and $\theta_{lik}$ are hyper parameters for the covariance and likelihood functions and wherein $\sigma^2$ is Gaussian noise that is independent and identically distributed and represents the uncertainty of the user when carrying out the graduated responses;

using a gradient ascent or gradient descent approach to find a maximum of the mean of the predictive distribution with respect to the input, x*, using the gradient given by:

$$\frac{\partial \mu^*(x^*)}{\partial x^*} = \left[\frac{\partial k_*(x^*)}{\partial x^*}\right]^T (M^TMK + \sigma^2 I_{n \times n})^{-1} M^T y.$$

21. A hearing aid system comprising a program storage for storing an executable program, and a processor for executing said program to perform the following method:

providing a set of parameters $x_1, x_2, \ldots, x_d$ to be optimized;

providing a first sound based on a first parameter value setting $x_1=[x_{11}, x_{21}, \ldots, X_{d1}]$ and providing a second sound based on a second parameter value setting $x_2=[x_{12}, x_{22}, \ldots, x_{d2}]$;

prompting a user to rate said first and second sounds relative to each other;

providing a user response $y_1$ representing the user's rating of the two sounds relative to each other;

providing m user responses $y=[y_1, y_2, \ldots, y_m]$ wherein each of the user responses represent the user's rating of two sounds relative to each other and wherein the sounds are derived from a multitude of n parameter value settings $x_1, x_2, \ldots, x_n$;

defining a likelihood function as:

$p(y_k|f(x_u), f(x_v), \sigma)$ wherein $f(x_u)$ and $f(x_v)$ represent specific function values of the user's internal response function f, wherein $y_k$ represents a specific user response and wherein $\sigma$ represents the noise of the user response;

defining the likelihood as:

$$p(y \mid f) = \prod_{k=1}^{m} p(y_k \mid f(x_u), f(x_v), \sigma)$$

wherein the likelihood represents a multivariate distribution over the user responses y;

obtaining a prior distribution over the function values of the user's internal response function;

using Bayes rule to obtain an analytical posterior distribution over the function values of the user's internal response function;

deriving an analytical expression for the predictive distribution based on the analytical expression of the posterior distribution over the function values of the user's internal response function; and using the analytical expression for the predictive distribution to find the parameter value settings that the user prefers.

* * * * *